J. H. WAGENHORST.
VEHICLE WHEEL AND RIM THEREFOR.
APPLICATION FILED JULY 20, 1915.

1,201,120. Patented Oct. 10, 1916.
4 SHEETS—SHEET 1.

Inventor
James H. Wagenhorst
By his Attorney
Edward Davis

UNITED STATES PATENT OFFICE.

JAMES H. WAGENHORST, OF AKRON, OHIO, ASSIGNOR OF ONE-FIFTH TO THE UNITED RIM COMPANY, A CORPORATION OF OHIO, TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL AND RIM THEREFOR.

1,201,120.  Specification of Letters Patent.  Patented Oct. 10, 1916.

Original application filed June 10, 1912, Serial No. 702,852. Divided and this application filed July 20, 1915. Serial No. 40,831.

*To all whom it may concern:*

Be it known that I, JAMES H. WAGENHORST, a citizen of the United States, residing at Akron, county of Summit, and State of Ohio, have invented certain new and useful Improvements in Vehicle-Wheels and Rims Therefor, of which the following is a specification.

This invention relates to vehicle wheels, and particularly to improvements in the means for securing pneumatic or other resilient tires thereto, being more particularly directed to improvements in the structure of tire-carrying rims.

It has heretofore been common practice to provide vehicle wheels with removable rims for carrying pneumatic or other resilient tires, the rims being removably secured upon the wheels so as to permit a rim with a tire mounted thereon to be readily removed and replaced by another rim provided with a tire. Such structures are known as "demountable rims", whose tire-carrying element will be hereinafter designated as the "removable rim" for purpose of distinction between it and the circular rim of the wheel, in which the outer ends of the spokes are inserted, and which is sometimes termed "fixed rim", and will be hereinafter so designated in accordance with the requirement of the Patent Office. They are particularly advantageous when used with pneumatic tires, as a removable rim with a ready-inflated tire thereon may be substituted for another rim carrying a damaged tire, quickly and with little labor. The delays incident to changing a pneumatic tire upon a removable rim and to inflation of the tire are thus eliminated. Removable rims, as heretofore constructed, have generally been secured upon wheels by means of bolts, wedges, or other attaching devices, though in some cases a transversely split removable rim has been used which has been contracted upon the wheel felly either by the pressure of the air in the tire or by some contracting device, the removable rim being thus clamped in position. Such contractible rims have operated satisfactorily in some cases, though difficulty has not infrequently been experienced owing to the contraction of the removable rim causing the same to draw unequally upon the beads of the tire in case the beads stick to the rim.

By means of my present invention I eliminate the wedges, bolts and other clamping devices for securing the removable rim upon the wheel, and also avoid the use of a transversely split extensible and contractible tire-carrying removable rim, but at the same time provide means for removably securing a removable rim upon a wheel felly quickly and firmly. I accomplish this result by transversely splitting the fixed rim itself and providing means for expanding the same within the tire-carrying or removable rim, or contracting the same so as to permit the tire-carrying rim to be removed.

My invention is particularly applicable to wheels with metallic rims and wire spokes, as in such wheels the fixed rim may be expanded and contracted easily and without danger of racking the wheel as in the case of the ordinary wooden artillery wheel.

The nature of my improvements in removable rims will fully appear from the following detailed description:

In the accompanying drawings, which form a part of this specification.

Referring to the drawings in detail, and particularly to Figs. 1 to 8 and 10 and 11, the numeral 1 designates a vehicle wheel having a hub 2, fixed rim 3 and spokes 4. As shown in the drawings, the spokes are of wire, the fixed rim comprising a rolled metallic channel having legs 5 and 6 of unequal height. I do not wish to limit my invention exclusively to wheels of this construction, however, although certain features of my invention are best adapted to use in connection with wire wheels. The fixed rim 3 is transversely split at the point 7, a lug 8 being provided near each end thereof. Said lugs 8 are adapted to be engaged by the means for expanding and contracting the fixed rim, said means in the form of my invention shown in Figs. 1, 2 and 3 comprising the right and left screw or turn-buckle 9, the ends of which screw through properly threaded holes in the lugs 8, the screw being provided with a central hexagonal head 10 by which the same may be rotated to expand and contract the fixed rim. The means for contracting and expanding the fixed rim may, however, be varied as may be found desirable; for example, the structure shown in Fig. 9 may be used, in which the screw has a head 11 at one end in place of the central head 10 shown in Figs. 1 to 5. The location of the screw-head at the end of the screw permits the application of a ratchet wrench thereto. In the construction shown in Fig. 9 one part of the screw 12 is made of greater diameter than the oppositely threaded portion 13, thus permitting the parts to be easily assembled. It is obvious that the expanding and contracting means can be modified in many other ways. 14 is the tire-carrying or removable rim, which may be of any suitable construction, either split or endless, but it preferably comprises the endless rim base 15 having the seats 16 and 17 of different heights, adapted to seat on the bearing surfaces of different heights formed by the edges of the legs 5 and 6 of the channel-shaped fixed rim. The under-surface of the rim base may seat directly upon the leg 5 if desired, but I prefer to form the slightly projecting seat 16 by rolling a shallow depression in the rim base, as the removable rim will free itself from the leg 5 more easily upon a slight lateral movement of the removable rim if such a seat be provided. In removable rims having a depressed channel at one edge thereof for the reception of a removable tire-retaining flange, as in the form herein illustrated, the seat 17 may be advantageously formed by offsetting the inner wall of this channel as shown. The portion 18 of the channel wall engages the side of the leg 6 and serves to limit lateral movement of the removable rim upon the wheel and thus insures a proper alinement of the removable rim and fixed rim when the parts are assembled. It is to be understood that by making the legs 5 and 6 of the channel of different heights, the fixed rim is provided at its edges with bearing surfaces of different diameters upon which seat the bearing surfaces of corresponding diameters of the removable rim. The provision of bearing surfaces of different diameters is most important, as it permits the free application and removal of the removable rim with the minimum of clearance between the removable rim and fixed rim. The valve stem may be "buttonholed" through its opening in the fixed rim and the removable rim seated in position thereon or removed therefrom with only a fraction of the clearance essential to permit a removable rim to be similarly applied to a flat fixed rim. This is of the greatest advantage, as it necessitates only a very limited expansion and contraction of the fixed rim. As will be obvious, a requirement of any large expansion or contraction to effect the desired result would be prohibitive as the wheel structure does not permit of extended variation in size. The removable rim base is provided at one side with the channel 19 for receiving the base 20 of the transversely split removable tire-retaining flange 21. The outer wall 22 of this channel is preferably bent inward to form an overhanging hook-shaped flange, which engages the base 20 of the tire-retaining flange, the base being formed of dovetail cross section as shown, in order to interlock with the hooked outer wall 22. In removable rims of this class as heretofore constructed, the outer wall of the channel has been vertical, and the side walls of the base of the tire-retaining flange have also been vertical. The present structure is a decided improvement over the former practice, as by bending the outer wall of the channel inward and interlocking it with the base of the tire-retaining flange, the tire-retaining flange is reinforced and strengthened by the wall of the channel, and both it and the channel wall may be made of lighter construction than is found necessary where these parts do not interlock. A material saving in weight is thus effected. This is a very important result, as excessive weight has been one of the principal objections to removable rims provided with detachable tire-retaining flanges, particularly where such flanges are made reversible so as to take both clencher and straight-sided tires, thus making the removable rim what is known as a "universal" removable rim.

Figure 1:
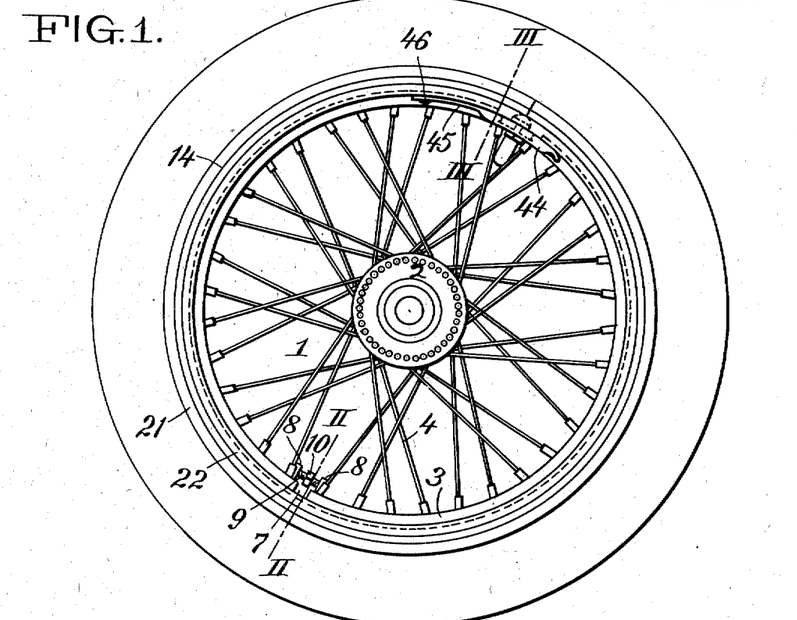
Figure 1 is a side elevation of a vehicle wheel carrying a removable rim with a tire mounted thereon and illustrating one embodiment of my invention.
Figures 2, 3, 4:
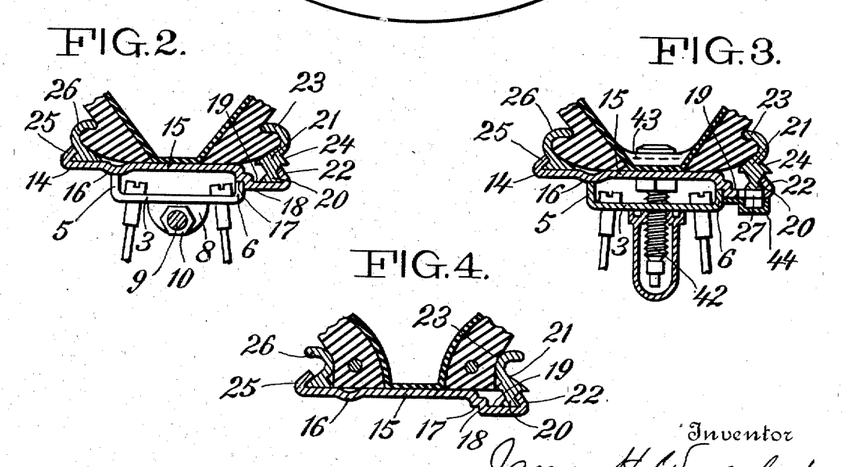
Fig. 2 is a transverse section taken on line II—II of Fig. 1.
Fig. 3 is a section taken on line III—III of Fig. 1.
Fig. 4 is a transverse section through a portion of the tire-carrying or removable rim removed from the wheel, the removable rim flanges being reversed to engage a straight-sided tire.
Figure 5:
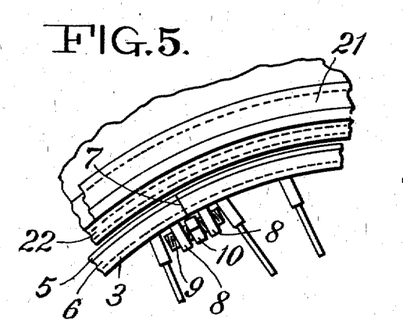
Fig. 5 is a side elevation of a portion of the fixed rim, the removable rim and base of the tire, shown in Fig. 1, the ends of the fixed rim being shown drawn together to contract the fixed rim.

As will be noted, both sides of the base 20 of the flange 21 are undercut, so that the flange is reversible, it being shown in engagement with a clencher tire in Figs. 2 and 3, and in engagement with a straight-sided tire in Fig. 4. The side of the flange 21 formed for engagement with a straight-sided tire, has an annular bearing surface 23 of convex section, which engages a side of the tire as shown in Fig. 4, the flange being provided with a groove 24 below its curved bearing surface, in order to reduce the weight of the flange. For retaining the tire at the opposite side of the removable rim, the latter may be provided with an integral tire-retaining flange, but is preferably provided with a low, inwardly hooked flange 25, which engages with an endless removable and reversible tire-retaining flange 26.

Figure 6:
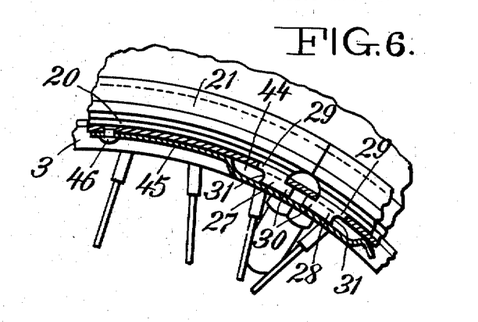
Fig. 6 is a side elevation of another portion of the fixed rim, the removable rim, and base of the tire, a portion of the removable rim being broken away to show the locking lugs formed at the ends of the removable flange of the removable rim, the dust cap being shown in section.
Figure 7:
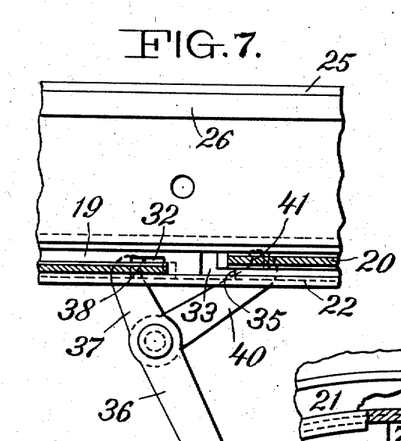
Fig. 7 is a plan view of a portion of a removable rim with the tire removed, the transversely split removable flange being shown in circumferential section, in the position which it occupies preparatory to being locked to the base of the removable rim, this figure also illustrating the tool used for moving the ends of the flange into locking position.
Figure 8:
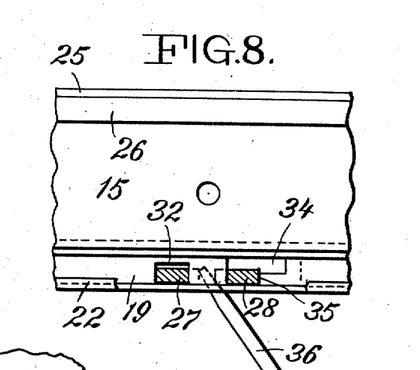
Fig. 8 is a view similar to Fig. 7, the transversely split tire-retaining flange being removed, its lugs being shown in section in locked position in the slots formed in the removable rim. The end of the tool is shown inserted between the lugs preparatory to unlocking the lugs from their slots.

For securing the transversely split removable tire-retaining flange 21 in its channel 19 at the side of the removable rim base, I have devised improved locking means which will now be described. In accordance with my improvement, the ends of the flange are provided with lugs 27 and 28, which are preferably similarly shaped. Each of these lugs has a body part 29 and an extension 30, the extensions of the two lugs approaching each other. The back of each lug has a notch 31 formed therein. The bottom of the channel 19 is provided with two slots 32 and 33 for the reception of these lugs. The slot 32 is of the same length as the body portions 29 of the lugs, but is made of somewhat greater width than the lugs, as shown in Fig. 8, so as to permit the lug therein to be moved laterally sufficiently to free the undercut base portion 20 of the flange from the hooked wall 22 of the channel. The second slot 33 is made much wider than the slot 32 and is provided with a circumferentially offset portion 34 of sufficient width to receive the body portion of one of the lugs. The operation of this structure is as follows: It being desired to apply the split flange to the removable rim base, one of the lugs, for example 27, is inserted in the slot 32, this being accomplished by tilting the end of the flange at an angle to the removable rim base so as to permit the extension 30 of the lug to be first passed through the slot 32. The base portion of the flange is then seated in the channel 19, the extension 30 of the lug 27 engaging beneath the portion of the bottom of the channel between the slots 32 and 33 as shown in Fig. 6. As the base of the flange is seated in this channel, the body portion 29 of the lug 27 enters the slot 32 and fits the same closely, thus preventing circumferential movement of that end of the flange with relation to the removable rim base. The width of the slot 32 being slightly greater than that of the lug, permits the lug to be inserted and the flange bearing the lug to be moved laterally until the dovetail-shaped base 20 of the flange engages beneath the hooked outer wall 22 of the channel. The base 20 of the flange is then sprung into the channel all the way around the removable rim, beginning at the lug 27. The second lug 28 is then inserted in the offset portion 34 of the slot 33 as shown in Fig. 7. The flange is then drawn tightly about its seat, and the lug 28 is forced laterally outward in the slot 33 until the rear wall of the body portion 29 of the lug 28 engages the wall 35 of the slot 33 as shown in Fig. 8. The flange is thus locked tight upon its seat and held against expansion.

The drawing together of the ends of the flange and moving of the lug 28 laterally in the slot 33, as above described, may be accomplished in any suitable manner, but preferably by means of a tool such as that illustrated in Fig. 7. This figure shows the tool applied to the lugs just preparatory to operating the same to contract the flange upon its seat and move the lug 28 laterally into locked position. The tool shown comprises a lever 36 having an arm 37 terminating in a hook 38 which engages in the notch 31 formed in the lug 27, the notched portion of the lug projecting below the bottom of the channel 19 as shown in Figs. 3 and 6. Pivoted to the lever 36 by means of a pivot 39 is an arm 40 terminating in a hook 41 which engages the notch 31 formed in the lug 28. It will be seen that by moving the lever 36 the hook 41 will draw the lug 28 toward the lug 27, thus tightening the flange upon its seat, and that when the lug 28 reaches the wide part of the slot 33 the tool will have a tendency to draw the lug outward until its rear wall seats against the wall 35 of the slot 33 as shown in Fig. 8. The application of the tool to the lugs in a plane practically parallel to that of the rims and the hooked formation of the ends of the tool arms make this lateral shifting of the lug in the slot possible.

Any suitable means may be used for preventing the lug 28 from slipping inward so as to loosen the flange. When the tire is inflated the air pressure will be ample for this purpose. As a matter of precaution, however, the valve stem 42 may be located opposite to the split in the flange, the valve stem being provided with the usual clip 43 as illustrated in Fig. 3, which serves to hold the tire pressed against the flange opposite to the lugs and thus prevent the inward movement of the lugs even though the tire should accidentally become deflated. It is obvious that any other suitable locking device for holding the lugs in position can be used if desired, for example, the dust cover for the lugs can be made to perform that function, as will be hereinafter described.

To remove the flange from the removable rim, the clip 43 is pushed up by the valve stem in the usual manner and the end of the lever 36 or other suitable tool inserted between the ends of the extension portions 30 of the lugs 27 and 28, as shown in Fig. 8, and used to pry the lug 28 out of engagement with the shoulder 35. The flange is thus loosened, permitting the lug 28 to be lifted from the slot 33, when the flange may be removed in an obvious manner.

Figures 9, 11:
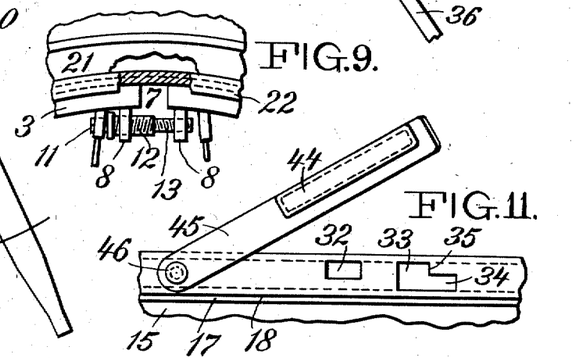
Fig. 9 is a side elevation of a portion of a fixed rim, the removable rim, and tire illustrating a modified form of bolt for expanding and contracting the fixed rim, a portion of the removable rim being broken away.
Fig. 11 is a plan view of the under-side of a portion of the tire-carrying or removable rim showing the slots therein for receiving the lugs on the ends of the transversely split tire-retaining flange, and showing the dust cap swung out of its operative position in order to expose said slots.
Figure 10:
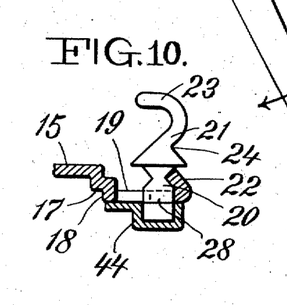
Fig. 10 is a transverse section on an enlarged scale of the transversely split removable tire-retaining flange and of a fragment of the removable rim base.

In order to cover the slots 32 and 33 and the lugs projecting therethrough, I preferably provide a dust cap 44 which is removably secured in position in any suitable manner, for example, the dust cap may be mounted upon a spring arm 45 which is pivoted to the bottom of the channel portion of the removable rim by the pivot 46. With this construction it will be seen that the dust cap may be sprung away from the removable rim sufficiently to clear the projecting portions of the lugs, and may thus be swung about pivot 46 as indicated in Fig. 11, to expose the lugs and permit of their engagement by the operating tool. After the operating tool has been removed, the dust cap may be swung back in position and sprung over the lugs, the engagement of the lugs with the walls of the dust cap preventing its accidental lateral displacement. The side walls of the dust cap or cover are preferably made to fit the lugs closely, so that the dust cover will prevent the lug 28 from moving laterally sufficiently to enter the offset portion 34 of the slot 33. It will be seen that although the dust cover is not rigidly connected to the removable rim, it will act in this manner as it fits the two lugs closely and cannot pivot thereon, and the lug 28 is capable of only a very limited lateral movement in its slot. Thus, even if the dust cover shifts laterally with the lugs, the lug 28 can move no farther than the lug 27 and cannot become disengaged from the shoulder 35. It will be seen that by using a movable dust cap I am enabled to apply the operating tool for the flange directly to the projecting portions of the lugs and thus avoid the necessity for providing sockets in the ends of the split flange expressly for engagement with the operating tool, as has heretofore been found necessary. Such sockets are unsightly and have usually been made as small as possible, with the result that they are often unsatisfactory for the purposes for which they are intended, and provide a very insecure engagement for the operating tool. They also fill up with dirt which must be cleaned out to permit the tool to be applied. The locking lugs, on the other hand, are necessarily amply large and strong and afford excellent engagement for the tool. They also permit the tool to be used to draw one of them laterally in the wide slot 33, as above described.

It is to be noted that by making the lugs 27 and 28 identical in construction, either lug may be inserted in either of the slots 32 or 33, and the flange is made reversible. While detachable flanges provided with lugs interlocking with slots in a removable rim have heretofore been used, such flanges have not been reversible. Also, it has not been possible in such removable rims to engage the operating tool directly with the lugs, but special connections for the operating tool have been required.

In mounting the tire-carrying removable rim upon the wheel with the transversely split fixed rim as above described, the removable rim is preferably so located upon the fixed rim that the locking lugs, dust cover, and valve stem and clip are diametrically opposite to the expanding means for the fixed rim. The weight of these parts is thus utilized to counterbalance the weight of the expanding means and a substantially balanced wheel is obtained.

In Figs. 12 to 18 I have illustrated a modified form of my invention in which wedges are used to expand the fixed rim. For purposes of illustration I have shown the fixed rim as transversely split at two diametrically opposite points, but this is not necessary, as the wedges may be used for expanding a fixed rim split at one or a plurality of points, and the turn-buckle arrangement shown in Fig. 1 may be utilized with a fixed rim split in more than one point if desired. The construction of the wedges for expanding the fixed rim is illustrated in detail in Figs. 13, 14, 16, 17 and 18. 50 is the fixed rim transversely split at diametrically opposite points. The adjacent ends of the fixed rim are beveled in opposite directions from the center, as indicated at 51 in Figs. 16 and 17. The fixed rim is preferably channel-shaped as in the form of my invention previously described, it being provided with flanges 52 and 53 forming the bearing surfaces of different diameters for the tire-carrying removable rim. For forcing the ends of the fixed rim apart, I provide a pair of wedges 54 which are adapted to be engaged with the beveled ends of the fixed rim and turn-buckle to force the ends apart.

Figure 12:
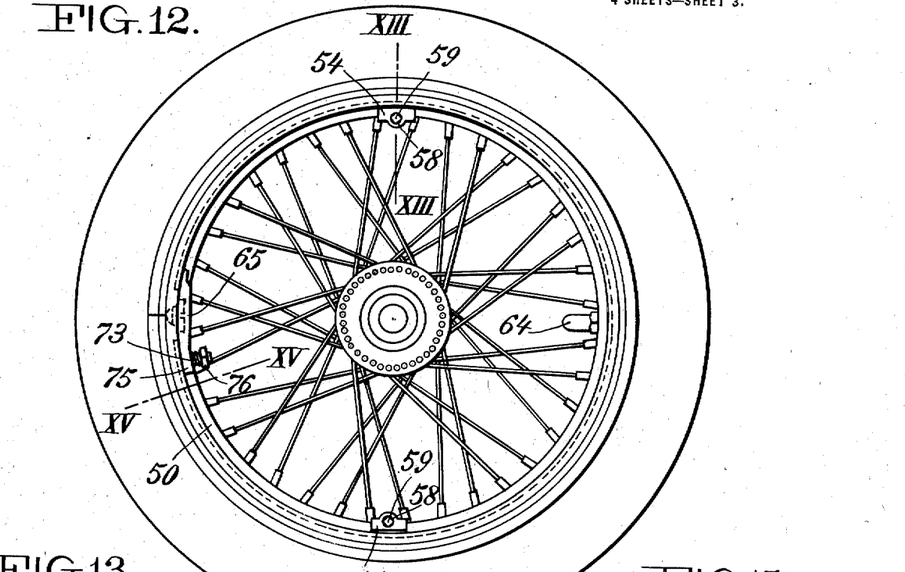
Fig. 12 is a side elevation of a vehicle wheel, fixed rim and removable rim with a tire thereon embodying a modified form of my invention.
Figures 13, 14, 15, 16, 17, 18:
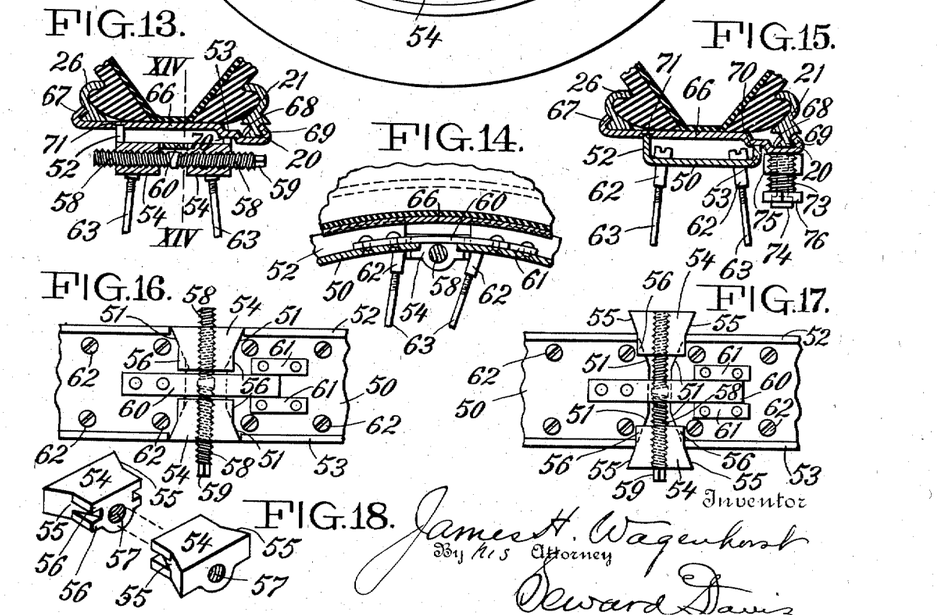
Fig. 13 is a transverse section through the base of the tire, removable rim, and fixed rim on line XIII—XIII of Fig. 12.
Fig. 14 is a circumferential section through the parts shown in Fig. 13 on line XIV—XIV of that figure.
Fig. 15 is a view similar to Fig. 13, the section being on line XV—XV of Fig. 12.
Fig. 16 is a plan view of a portion of the fixed rim of the wheel shown in Fig. 12, the tire-carrying removable rim and tire being removed and the wedges being forced in to expand the fixed rim.
Fig. 17 is a view similar to Fig. 16 with the wedges drawn out to permit the fixed rim to contract.
Fig. 18 is a perspective view of the two wedges removed from the fixed rim.

Each wedge 54 has converging wedging surfaces 55 which engage the beveled ends of the fixed rim, these surfaces having projecting therefrom the parallel lugs 56 which engage the outer and inner surfaces of the bottom of the channel and thus serve to guide the wedges and enable the wedges to lock the ends of the fixed rim in alinement so far as radial displacement is concerned. Each of the wedges has a screw-threaded hole 57 therethrough, one of the wedges of each pair being provided with a right-hand thread, while the other has a left-hand thread therein. For drawing the wedges together, a right and left-hand screw 58 is used which extends transversely of the fixed rim and is provided at one end with a head 59 for the reception of a key or wrench. The wedges held together with the right and left hand screw serve to hold the ends of the fixed rim against lateral displacement as well as against radial displacement but as additional means for assuring accurate alinement of the ends of the fixed rim and preventing any possibility of lateral displacement, I preferably attach to one end of the fixed rim a projecting tongue 60 which slides in a guide-way formed upon the other end of the fixed rim in any suitable manner, as by attaching blocks 61 thereto between which the end of the tongue 60 slides. These parts are preferably secured inside the fixed rim channel to the bottom thereof, so that they are concealed from view when the wheel is in use. The wedges drawn together with a screw form a very powerful means for expanding the fixed rim and enable the same to be expanded within the tire-carrying removable rim with great force, thus insuring a tight clamping of the removable rim on the fixed rim. It is unnecessary to provide any special means for contracting the fixed rim, as the spokes of the wheel are under high tension and diametrically contract the fixed rim to an extent sufficient to permit the removable rim to be removed therefrom as soon as the wedges are withdrawn sufficiently to permit such contraction. Fig. 17 shows the wedges thus withdrawn, while Figs. 12, 13, 14 and 16 show the wedges forced together and the fixed rim expanded. 62 represents the nipples into which the ends of the spokes 63 are screwed. As will be seen from Figs. 16 and 17, the spokes are preferably so arranged that when the fixed rim is expanded they will be evenly spaced, the spokes adjacent to the point where the fixed rim is split approaching each other somewhat when the fixed rim is contracted as shown in Fig. 17. Fig. 12 shows a desirable arrangement of the expanding means for the fixed rim, the valve stem and the locking means and dust cap for securing the ends of the transversely split removable flange of the removable rim when a rim of such character is used. As will be seen from this figure, these parts are evenly spaced about the periphery of the wheel. The valve stem dust cap is indicated at 64, while 65 is the dust cap for inclosing the locking lugs on the ends of the transversely split tire-retaining flange. The two sets of wedges 54 exactly balance each other, while the valve-stem and its associated parts approximately balance the locking lugs of the removable tire-retaining flange and the dust cap therefor. A substantially balanced wheel is thus obtained.

Figure 22:
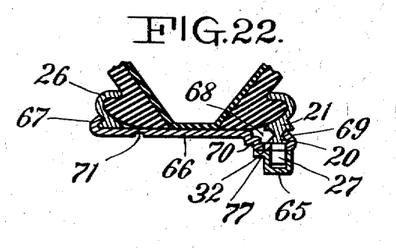
Fig. 22 is a transverse section on line XXII—XXII of Fig. 21.
Figure 23:
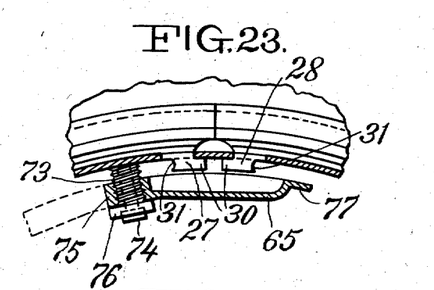
Fig. 23 is a view similar to Fig. 21 showing the dust cap screwed away from the under-surface of the fixed rim sufficiently to permit it to be rotated away from the locking lugs, such rotated position being indicated in dotted lines.

In Figs. 12, 13, 14, 15, 21, 22 and 23 I have shown a slightly modified form of tire-carrying removable rim adapted to be removably secured upon a wheel having the expansible fixed rim as above described, although this removable rim is capable of being removably secured upon a wheel by the use of any other appropriate devices or of being permanently secured upon a wheel, as may be desired. In the form illustrated the tire-carrying removable rim comprises a rim base 66 having a flange 67 at one edge thereof which engages the endless reversible tire-retaining flange 26. At the other side the rim base has a depressed channel 68 formed therein, this channel preferably having an inwardly hooked outer wall 69. In this channel is received the base 20 of the transversely split tire-retaining flange 21 of the form already fully described. The bottom of the channel 68 is provided with the slots 32 and 33 for the reception of the lugs 27 and 28 formed upon the ends of the flange 21. The inner side wall of the channel 68 preferably has an offset formed therein similar to the offset formed in the wall of the channel of the rim base illustrated in Figs. 1 to 11, the bottom wall 70 of this offset forming a bearing surface adapted to engage the bearing surface formed by the lower flange 53 of the channel-shaped fixed rim 50. The side wall of the channel need not, however, be made to engage the side of the flange 53 if the construction shown and about to be described is used at the other side of the fixed rim. Such construction consists in forming a shallow groove 71 in the under-surface of the rim base, this groove receiving the edge of the higher flange 52 of the channel-shaped fixed rim, the bottom of the groove 71 forming a bearing surface upon the removable rim of greater diameter than the bearing surface 70. It will be seen that when the fixed rim is expanded an edge of the flange 52 will be received in the groove 71 and the removable rim thus effectually locked against lateral movement in either direction so long as the fixed rim remains expanded. The dust cap or cover 65 for inclosing the locking lugs on the ends of the removable tire-retaining flange, instead of being mounted upon the end of a spring arm pivoted to the removable rim, as in the form of my invention previously described, is attached to the removable rim by means of a screw or bolt, so that it may be screwed toward or away from the under-surface of the removable rim. For this purpose a stud 72 is riveted to the bottom of the channel of the removable rim base, this stud carrying a screw-threaded boss 73 which rotates freely about the stud and is retained in position by a head 74. The cover 65 has a solid piece 75 at one end thereof which has a screw-threaded opening therethrough and screws upon the boss 73. The rotation of the boss will cause the cover to move toward or away from the removable rim. When the cover is screwed away from the removable rim into the position shown in Fig. 23, its movement in that direction will be checked by reason of its engagement with the head 76 of the boss 73. The further rotation of the boss through a half revolution will throw the cover into the position indicated in dotted lines in Fig. 23, where it will be entirely out of the way of the lugs projecting through the slots in the removable rim and will permit a tool to be applied to the lugs for operating the same as indicated in Figs. 7 and 8. The cover is preferably provided with a flange 77 in order to completely close the slots in the removable rim. The recess in the dust cover is preferably made of the same width as the lugs, so that when the cover is screwed up it will closely engage the lugs, as shown in Fig. 22. The cover will thus serve to prevent the lateral movement and possible disengagement of the lugs, and so acts as a lock for the lugs as well as simply to exclude dust or water from the lugs and slots. When the cover is constructed in this manner it is unnecessary to place a clip in the tire opposite the split in the flange, or to use any other locking means for the flange, and this makes it possible to locate the valve stem opposite to the split in the flange and thus secure a better balancing of the wheel.

Figure 24:
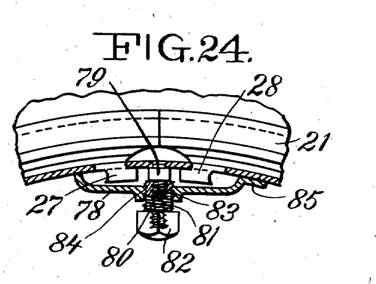
Fig. 24 is a view similar to Fig. 21, illustrating a modified form of dust cap.
Figure 25:
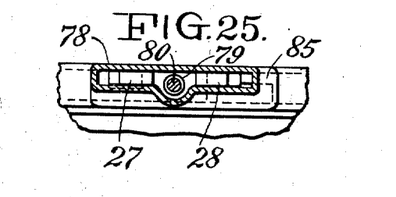
Fig. 25 is a view of the under-side of a portion of the structure shown in Fig. 24, the dust cap and its supporting stud being shown in section.
Figure 26:
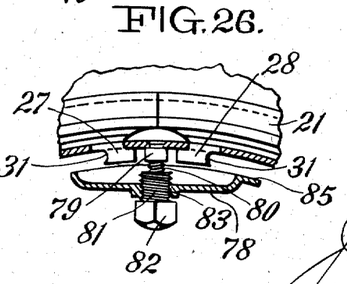
Fig. 26 is a view of the parts shown in Fig. 24, the dust cap being screwed away from the under-surface of the fixed rim to permit access to the locking lugs.

In Figs. 24, 25 and 26 I have illustrated a modification of the form of dust cover above described. In this form of my invention the construction of the removable rim base with the slots therein and the transversely split removable tire-retaining flange provided with the lugs projecting through the slots is the same as that above described, except that the distance between the slots is preferably made somewhat greater and the lugs are placed somewhat farther from the ends of the flange. 78 is the dust cover which is carried by means of a stud 79 riveted to the rim. The stud 79 is externally threaded as indicated at 80, and upon this threaded portion of the stud screws a nut 81 having a head 82. The nut 81 is preferably externally threaded, as indicated at 83, and upon this externally threaded portion screws the dust cap which has a boss 84 located approximately midway of its length, this boss having a screw-threaded opening therethrough. The thread on the stud 79 and the thread on the exterior of the nut 81 are of opposite pitches, so that when the nut is unscrewed along the stud the dust cap will simultaneously travel along the surface of the nut toward the head thereof. The dust cap will thus have a rapid flight and but a few turns of the nut will be required to move the same from the position shown in Fig. 24 to that shown in Fig. 26. With the dust cover in the position shown in Fig. 26, a tool may be applied to the lugs as indicated in Fig. 7. In order to disengage the lug 28, a tool may be used as indicated in Fig. 8, except that the end of the tool will be inserted between the end of the lug and the stud 79. The dust cover is preferably made of a width to fit the lugs closely, as indicated in Fig. 25, for the purpose of locking the lugs against lateral displacement, as described above. The dust cover is preferably provided with a flange 85 to completely close the slots in the rim.

Figure 19:
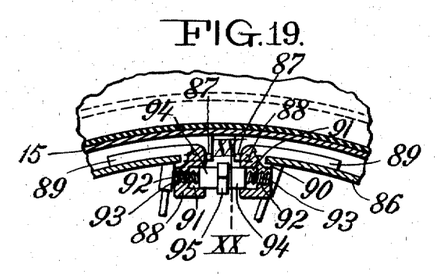
Fig. 19 is a circumferential section through a tire-carrying or removable rim and the fixed rim of a wheel illustrating a modified means for expanding and contracting the fixed rim.
Figure 20:
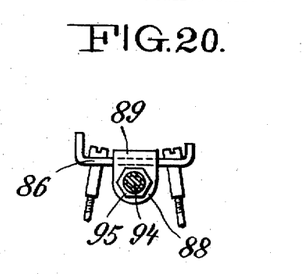
Fig. 20 is a transverse section on line XX—XX of Fig. 19, the removable rim and tire being removed.
Figure 21:
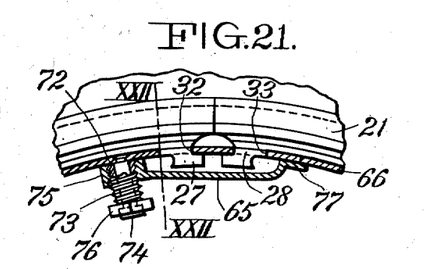
Fig. 21 is a view showing a portion of the base of the removable rim in section and showing the ends of the transversely split locking ring in side elevation, this figure illustrating in section a modified form of dust cap for inclosing the locking lugs.

In Figs. 19 and 20 I have illustrated a modified means for connecting the ends of the split fixed rim and effecting the expansion and contraction of the latter. In these figures 86 is the fixed rim, which is preferably of channel-shape, as shown in Fig. 20. The bottom of the channel is notched at the side of the split therein, as shown at 87 in Fig. 19. Secured to each end of the fixed rim is a lug 88 which preferably has an extension 89 welded, riveted or otherwise secured to the inside of the bottom of the channel where it will be out of sight and will not detract from the appearance of the wheel. The lugs pass through the slots 87 and preferably have shoulders 90 engaging beneath the bottom of the fixed rim channel. The adjacent faces of the lugs 88 have cylindrical recesses 91 therein, screw-threaded openings 92 being formed through the lugs in alinement with these recesses 91. A right and left screw or turn-buckle is used to connect the lugs, such turn-buckle comprising the threaded portions 93, which screw through the threaded openings through the lugs, the cylindrical portions 94 which slide in the recesses 91 and the central head or faceted portion 95 shaped to be engaged by a wrench or other suitable means for turning the same. The cylindrical portions 94 sliding in the recesses in the lugs serve to maintain the ends of the fixed rim in accurate alinement. In other respects the operation of this turn-buckle is the same as that of the structure illustrated in Figs. 1, 2 and 5. As will be understood, if desired the fixed rim may be divided at two or more points as indicated in Fig. 12, a corresponding number of the turn-buckles being used.

While I have illustrated in the drawings and described in detail certain specific embodiments of my invention, such specific embodiments are intended to be merely illustrative of the many forms which my invention may take, and I do not desire to be limited to the details shown and described any further than as specified in some of the more limited claims hereunto appended. As will be understood, certain features of my invention may be used without others, and I have therefore included claims for these individual features by themselves. All of the features of the invention, however, when embodied in a single structure coöperate to produce a superior vehicle wheel construction, in which the resilient tire may be readily attached to the tire-carrying removable rim, and in which such removable rim is capable of being applied to or removed from the wheel.

This application is a division of my copending application filed June 10, 1912, Serial No. 702,852.

Having thus described my invention, I claim:

1. A tire-carrying rim for a resilient tire adapted to seat upon a fixed rim, said tire-carrying rim having a channel formed at one side thereof, the inner wall of said channel being offset.

2. A tire-carrying rim for a resilient tire adapted to be mounted upon a fixed rim, said tire-carrying rim having a channel formed at one side thereof, the inner wall of said channel having a substantially right-angled offset formed therein, the horizontal wall of said offset constituting a bearing surface adapted to seat upon said fixed rim, slots formed in the bottom of said channel, and a transversely split tire-retaining flange seated in said channel and having locking lugs projecting through said slots.

3. A tire-carrying rim adapted to be mounted upon a fixed rim, said tire-carrying rim comprising a rim base having a flange at one side thereof, an endless reversible tire-retaining flange seated on said rim base and engaging said flange on the rim base, said rim base having an annular groove rolled therein near the side carrying said flange, the bottom of the groove of the rim forming a bearing surface, said rim base having a channel rolled therein at the opposite side thereof, the inner wall of said channel having an offset thereon, the said offset forming the other bearing surface, the outer wall of the channel in said rim base being inwardly hooked, the bottom of said channel being slotted, and a transversely split reversible tire-retaining flange mounted in said channel, said flange having a dove-tail-shaped base adapted to interlock with the inwardly hooked outer wall of said channel and having lugs at the ends thereof projecting through the slots in the bottom of the channel.

4. A tire-carrying rim for resilient tires comprising a rim base, means at one side thereof for retaining a tire, a depressed channel formed at the other side of said rim base, the inner wall of said channel being stepped and the outer wall being inwardly hooked.

5. A tire-carrying rim for resilient tires comprising a rim base having means at one side thereof for retaining a tire, said rim base having a channel formed therein at the other side thereof, the outer wall of said channel being inwardly hooked or undercut, a reversible transversely split tire-retaining flange, said flange having a dovetail-shaped base mounted in said channel and adapted to interlock beneath the outer wall of said channel when the flange is placed in either position in said channel, and means for locking the ends of said transversely split flange, said means comprising lugs extending through said channel.

6. A tire-carrying rim for resilient tires comprising a rim base having a projecting flange at one edge thereof, a reversible endless tire-retaining flange seated upon said rim base and retained by said flange, said rim base having a depressed channel formed at the other side thereof, the maximum diameter of the outer wall of said channel not exceeding the diameter of the tire-seating surface of said rim base, said wall being inwardly hooked, a transversely split reversible tire-retaining flange having a dovetail-shaped base mounted in said channel, said base adapted to interlock beneath said inwardly hooked wall when said flange is mounted in either position in said channel, and means for locking the ends of said transversely split flange.

7. A tire-carrying rim for resilient tires comprising a rim base having means at one side thereof for retaining a tire, and having at the other side thereof a channel, the bottom of the channel being slotted, and a transversely split tire-retaining flange mounted in said channel, lugs at the ends of said flange projecting through the slots in the bottom of the said channel and interlocking with the walls of said slots, the projecting ends of said lugs being formed for engagement with an operating tool adapted to force said lugs into interlocked position.

8. A tire-carrying rim for resilient tires comprising a rim base having means at one side thereof for retaining a tire, and a channel formed at the other side thereof, the bottom of said channel being slotted, and a transversely split tire-retaining flange mounted in said channel and provided at its ends with lugs projecting through the slotted bottom in said channel, and a dust cap movably secured to said rim base and adapted to be moved into or out of a position covering said lugs, whereby when said dust cap is moved out of such position, said lugs are exposed, said lugs being formed for engagement with a tool adapted to operate said flange.

9. A tire-carrying rim for resilient tires comprising a rim base having means at one side thereof for retaining a tire, and having a channel formed at the other side thereof, the bottom of said channel having slots therein, one of which is provided with a circumferentially offset portion of less width than the main portion thereof, and a transversely split tire-retaining flange mounted in said channel and provided with lugs at its ends for engagement with said slots, portions of said lugs projecting through said slots and adapted to interlock beneath the bottom of said channel, the end walls of the projecting portions of said lugs being notched to receive a tool for drawing one of said lugs out of the offset portion of the slot and interlocking the same with the end wall of the main portion of said slot.

10. A tire-carrying rim for resilient tires comprising a rim base having means at one side thereof for retaining a tire, and having a channel formed at the other side thereof, the bottom of said channel being provided with a rectangular slot and a slot having a wide portion and a longitudinally offset portion and a shoulder 35, and a transversely split tire-retaining flange mounted in said channel and having lugs at the ends thereof, each of said lugs having a body portion adapted to fit one of said slots, and an extension end adapted to interlock beneath the portion of the bottom of the channel separating said slots.

11. A tire-carrying rim for resilient tires comprising a rim base having means at one side thereof for retaining a tire, and having a channel formed at the other side thereof, the bottom of said channel being provided with a rectangular slot and a slot having a wide portion and a longitudinally offset portion and a shoulder 35, and a transversely split tire-retaining flange mounted in said channel and having lugs at the ends thereof, one of said lugs having a body portion of the same length as that of the rectangular slot, and having a portion projecting through said slot, one end of said portion extending under and interlocking beneath the portion of the channel bottom between said slots, the other end of said projecting portion being notched to receive a tool, the second lug having a portion adapted to fit between the shoulder 35 and the end of the second slot nearest the rectangular slot, said lug having a portion projecting through said slot, the end of said portion projecting under and interlocking beneath the portion of said channel bottom separating said slots, the other end of said projecting portion being notched to receive a part of the tool.

12. A tire-carrying rim for resilient tires comprising a rim base having means at one side thereof for retaining a tire and having a channel at the other side thereof, the bottom of said channel being slotted, and a transversely split tire-retaining flange mounted in said channel and having a clencher groove formed in one side thereof, the other side of said flange being formed for engagement with a straight-sided tire, said flange being reversible in said groove, lugs at the ends of said flange adapted to interlock with the slotted portion of the bottom of said channel, each of said lugs being shaped to interlock with the slotted portion of said channel when said flange is seated therein in either position.

13. A tire-carrying rim for resilient tires comprising a rim base having means at one side thereof for retaining a tire, and a channel formed at the other side thereof, the bottom of said channel being provided with a pair of slots, one of said slots being shaped to hold a lug fitted therein against circumferential movement, and the other of said slots having a portion adapted to hold a lug against circumferential movement, and a circumferentially offset portion adapted to permit a limited circumferential movement of said lug therein, and a reversible tire-retaining flange mounted in said channel, said flange having a clencher groove in one side thereof, the other side of said flange being shaped to engage a straight-sided tire, and identical lugs at the ends of said flange, each of said lugs being adapted to fit either of said slots.

14. A tire-carrying rim for resilient tires comprising a rim base having means at one side thereof for retaining a tire, and having a seat for a removable tire-retaining flange at the other side thereof, a slot in the bottom of said seat, a dust cap pivoted to the inside of said rim and adapted to be swung into positions to cover said slot or to uncover the same, and a tire-retaining flange mounted on said seat and provided with a lug projecting through said slot and into said dust cap when the same is moved to operative position.

15. A tire-carrying rim for resilient tires comprising a rim base having means at one side thereof for retaining a tire, and having a seat for a removable tire-retaining flange at the other side thereof, the bottom of said seat being slotted, a transversely split tire-retaining flange mounted in said seat and having lugs projecting through said slotted bottom, one of said lugs adapted to be locked or unlocked in the slot by a lateral movement, and a dust cap movably secured to the rim and acting when in operative position to prevent lateral movement of said lug.

16. A tire-carrying rim for resilient tires comprising a rim base having means at one side thereof for retaining a tire and having a channel formed at the other side thereof, the bottom of said channel being provided with a rectangular slot and a slot having a wide portion and a longitudinally offset portion and a shoulder 35, and a transversely split tire-retaining flange mounted in said channel and having lugs at the ends thereof, said lugs passing through said slots and projecting below the bottom of the channel, a dust cap adapted to be engaged with said lugs when one of the same is engaged with the shoulder 35, and acting to retain said lug in engagement with said shoulder, and means for retaining said dust cap in position.

17. A tire-carrying rim for resilient tires comprising a rim base having means at one side thereof for retaining a tire, and a channel at the other side thereof, the bottom of said channel being slotted, a transversely split tire-retaining flange mounted in said channel and having lugs at its ends projecting through the slotted bottom of said channel, a dust cap adapted to receive the projecting ends of said lugs, and means for clamping said dust cap to said rim, said means being actuable to move said dust cap away from said rim and to permit the same to be swung out of the way from said lugs.

18. A tire-carrying rim for resilient tires comprising a rim base having means at one side thereof for retaining a tire, and a channel at the other side thereof, the bottom of said channel being slotted, a transversely split tire-retaining flange mounted in said channel, said flange having lugs at its ends projecting through the slotted bottom of the channel, a rotatable screw carried by the rim and projecting radially inward from the under-side thereof, and a dust cap having a portion screwing on said screw, said dust cap being adapted to cover the projecting ends of said lugs.

19. A tire-carrying rim for resilient tires comprising a rim base having means at one side thereof for retaining a tire, and a channel at the other side thereof, the bottom of said channel being slotted, a transversely split tire-retaining flange mounted in said channel, said flange having lugs at its ends projecting through the slotted bottom of said channel, a stud carried by the bottom of said channel and projecting radially toward the center of the wheel, an externally screw-threaded nut mounted on said stud and having a head for the engagement of a wrench, and a dust cap having a recess adapted to receive the projecting portions of said lugs, said dust cap having a screw-threaded opening at one end through which said externally threaded nut passes.

20. In combination, a tire-carrying removable rim, and a pneumatic tire having a valve stem, said removable rim including a transversely split removable tire-retaining flange and locking means located at the point where said flange is split for securing the ends of said flange in position, said locking means and the valve-stem of the tire being equal in weight and located at diametrically opposite points.

JAMES H. WAGENHORST.

Correction in Letters Patent No. 1,201,120.

It is hereby certified that Letters Patent No. 1,201,120, granted October 10, 1916, upon the application of James H. Wagenhorst, of Akron, Ohio, for an improvement in "Vehicle-Wheels and Rims Therefor," were erroneously issued to The United Rim Company, The B. F. Goodrich Company, The Goodyear Tire & Rubber Company, and The United States Tire Company, whereas said Letters Patent should have been issued to the inventor, *said Wagenhorst and The B. F. Goodrich Company, The Goodyear Tire & Rubber Company, and The United States Tire Company*, jointly, said Wagenhorst being owner of *one-fifth* interest in said invention, as shown by the records of assignments in this office; and that the said Letters Patent should be read with this correction therein that the same may conform to the record of the case in the Patent Office.

Signed and sealed this 21st day of November, A. D., 1916.

[SEAL.]
F. W. H. CLAY,
*Acting Commissioner of Patents.*

Cl. 152—21.